United States Patent [19]

Dragoset, Jr. et al.

[11] Patent Number: 5,587,965
[45] Date of Patent: Dec. 24, 1996

[54] SURFACE MULTIPLE ATTENUATION VIA EIGENVALUE DECOMPOSITION

[75] Inventors: William H. Dragoset, Jr.; Zeljko Jericevic, both of Houston, Tex.

[73] Assignee: Western Atlas International, Inc., Houston, Tex.

[21] Appl. No.: 638,282

[22] Filed: Apr. 26, 1996

[51] Int. Cl.$^6$ ............................... G01V 1/38; G01V 1/36
[52] U.S. Cl. .................................. 367/24; 367/21
[58] Field of Search ........................ 367/21, 24, 38; 364/421

[56] References Cited

U.S. PATENT DOCUMENTS

| | | | |
|---|---|---|---|
| 4,910,716 | 3/1990 | Kirlin et al. | 367/24 |
| 5,524,100 | 6/1996 | Paffenholz | 367/24 |

*Primary Examiner*—Ian J. Lobo
*Attorney, Agent, or Firm*—Charles R. Schweppe

[57] ABSTRACT

A marine seismic signal is transformed from time domain into frequency domain and represented by matrix D. The marine data signal is truncated in time, transformed into the frequency domain and represented by matrix $D_T$. Eigenvalue decomposition $D_T = S \cdot \Lambda \cdot S^{-1}$ of matrix $D_T$ is computed. Matrix product $D \cdot S$ is computed and saved in memory. Matrix inverse $S^{-1}$ is computed and saved in memory. An initial estimate of the source wavelet w is made. Source wavelet w is computed by iterating the steps of computing diagonal matrix $[I - w^{-1} \Lambda]$, computing matrix inverse $[I - w^{-1} \Lambda]^{-1}$, retrieving matrix product $D \cdot S$ and matrix inverse $S^{-1}$ from memory, and minimizing the total energy in matrix product $[D \cdot S] [I - w^{-1} \Lambda]^{-1} S^{-1}$. Primary matrix P representing the wavefield free of surface multiples is computed by inserting computed value for w into the expression $[D \cdot S] [I - w^{-1} \Lambda]^{-1} S^{-1}$. Primary matrix P is inverse transformed from frequency domain into time domain.

9 Claims, 5 Drawing Sheets

(PRIOR ART)

*FIG. 4*

(PRIOR ART)

SURFACE MULTIPLE ATTENUATION VIA EIGENVALUE DECOMPOSITION

BACKGROUND OF THE INVENTION

1. Field of the Invention

The present invention relates generally to marine seismic surveying and, more particularly, to a method for attenuating the effect of surface multiples in a marine seismic signal.

2. Description of the Related Art

Seismic surveying is a method for determining the structure of subterranean formations in the earth. Seismic surveying typically utilizes seismic energy sources which generate seismic waves and seismic receivers which are strategically positioned to detect the seismic waves. The seismic waves propagate into the formations in the earth, where a portion of the waves reflects from interfaces between subterranean formations. The amplitude and polarity of the reflected waves are determined by the differences in acoustic impedance between the rock layers comprising the subterranean formations. The acoustic impedance of a rock layer is the product of the acoustic propagation velocity within the layer and the density of the layer. The reflected seismic waves are detected by the seismic receivers, which convert the reflected waves into representative electrical signals. The signals are typically transmitted by electrical, optical, radio or other means to devices which record the signals. Through analysis of the recorded signals, the shape, position and composition of subterranean formations can be determined.

Land seismic surveying is a method for determining the structure of subterranean formations beneath the surface of the earth. The seismic energy source typically used is an apparatus capable of delivering a series of impacts or mechanical vibrations to the surface of the earth or the detonation of an explosive charge near the surface of the earth. The seismic receiver typically used in seismic surveying on land is a motion sensor, such as a geophone or an accelerometer. The seismic sources and seismic receivers are typically placed on the surface of the earth, although either source or receiver may be placed in a borehole for vertical seismic profiling. Both the seismic sources and the seismic receivers are typically repositioned to cover the survey area.

Marine seismic surveying is a method for determining the structure of subterranean formations underlying bodies of water. Marine seismic surveying typically utilizes seismic energy sources and seismic receivers located in the water which are either towed behind a vessel or positioned on the water bottom from a vessel. The energy source is typically an explosive device or compressed air system which generates seismic energy, which then propagates as seismic waves through the body of water and into the earth formations below the bottom of the water. As the seismic waves strike interfaces between subterranean formations, a portion of the seismic waves reflects back through the earth and water to the seismic receivers, to be detected, transmitted, and recorded. The seismic receivers typically used in marine seismic surveying are pressure sensors, such as hydrophones. Both the sources and receivers may be repositioned to cover the survey area.

Figure 1:
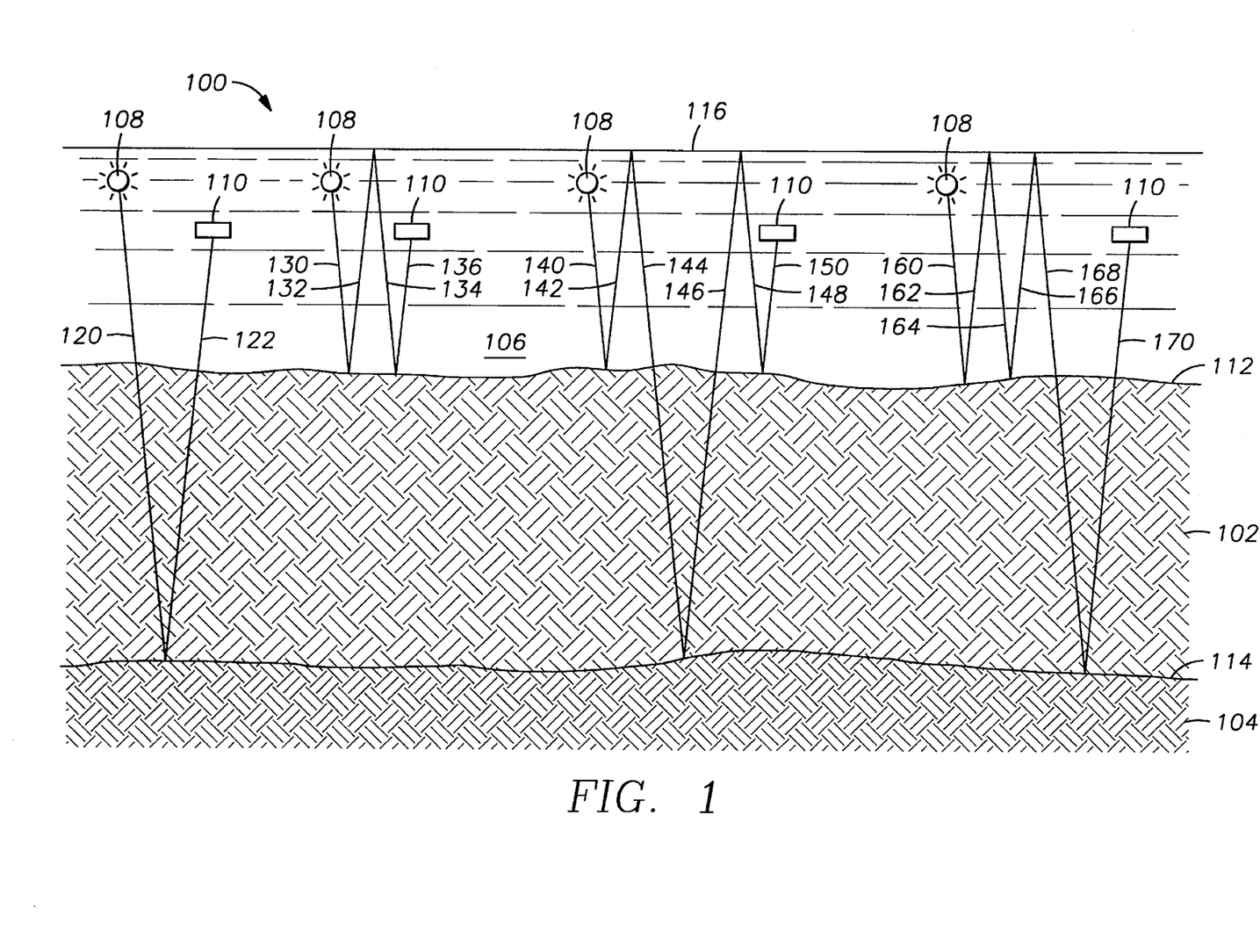
FIG. 1 is a diagrammatic view of marine seismic surveying, showing the source of surface multiples.

Seismic waves, however, do not reflect only from the interfaces between subterranean formations, as would be desired. Seismic waves also reflect from the water bottom and the water surface, and the resulting reflected waves themselves continue to reflect. Waves which reflect multiple times are called "multiples". Waves which reflect multiple times in the water layer between the water surface above and the water bottom below are called "water-bottom multiples". Water-bottom multiples have long been recognized as a problem in marine seismic processing and interpretation, so multiple attenuation methods based on the wave equation have been developed to handle water-bottom multiples. However, a larger set of multiples containing water-bottom multiples as a subset can be defined. The larger set includes multiples with lower reflections from subterranean formations in addition to reflections from the water bottom. The multiples in the larger set have in common their downward reflection at the water surface and thus are called "surface multiples". FIG. 1, discussed below, provides examples of different types of reflections.

FIG. 1 shows a diagrammatic view of marine seismic surveying. The procedure is designated generally as 100. Subterranean formations to be explored, such as 102 and 104, lie below a body of water 106. Seismic energy sources 108 and seismic receivers 110 are positioned in the body of water 106, typically by one or more seismic vessels (not shown). A seismic source 108, such as an air gun, creates seismic waves in the body of water 106 and a portion of the seismic waves travels downward through the water toward the subterranean formations 102 and 104 beneath the body of water 106. When the seismic waves reach a seismic reflector, a portion of the seismic waves reflects upward and a portion of the seismic waves continues downward. The seismic reflector can be the water bottom 112 or one of the interfaces between subterranean formation, such as interface 114 between formations 102 and 104. When the reflected waves travelling upward reach the water/air interface at the water surface 116, a majority portion of the waves reflects downward. Continuing in this fashion, seismic waves can reflect multiple times between the water bottom 112 or formation interfaces below and the water surface 116 above, as described more fully below. Each time the reflected waves propagate past the position of a seismic receiver 110, the receiver 110 senses the reflected waves and generates representative signals.

Primary reflections are those seismic waves which have reflected only once, from the water bottom 112 or an interface between subterranean formations, before being detected by a seismic receiver 110. An example of a primary reflection is shown in FIG. 1 by raypaths 120 and 122. Seismic waves are generated by a seismic source 108 and a portion of the waves travels downward through the body of water 106 and into the subterranean formation 102 along raypath 120. A portion of the seismic waves reflects from the interface 114 between formations 102 and 104. The reflected waves travel upward through the formation 102 and back into the body of water 106 along raypath 122. The reflected waves travel past a receiver 110, which detects the waves and generates a representative signal. Primary reflections contain the desired information about the subterranean formations which marine seismic surveying seeks. Surface multiples are those waves which have reflected multiple times between the water surface 116 and lower reflectors, such as the water bottom 112 or formation interfaces, before being sensed by a receiver 110. An example of a surface multiple which is specifically a water bottom multiple is shown starting at raypath 130. Seismic waves are generated by a seismic source 108 and a portion of the waves travels downward through the body of water 106 along raypath 130. A portion of the seismic waves reflects from the water bottom 112 and travels back upward through the body of water 106 along raypath 132. A portion of the reflected waves reflects from the water surface 116 and travels back downward through the body of water 106 along raypath 134. A portion of the twice-reflected waves reflects again from the water bottom 112 and travels back upward through the body of water 106 along raypath 136. The thrice-reflected waves travel past a receiver 110, which detects the waves and generates a representative signal. The surface multiple starting at raypath 130 is a multiple of order one, since the multiple contains one reflection from the water surface 116.

Two examples of general surface multiples which reflect from both the water bottom 112 and formation interfaces are shown starting at raypath 140 and starting at raypath 160. In the first example, seismic waves travel downward from a seismic source 108 through the body of water 106 along raypath 140, reflect from the water bottom 112 a first time and travel upward through the water 106 along raypath 142, reflect from the water surface 116 a first time and travel downward through the water 106 and then the formation 102 along raypath 144, reflect from the interface 114 and travel upward through the formation 102 and then the water 106 along raypath 146, reflect from the water surface 116 a second time and travel downward through the water 106 along raypath 148, and finally reflect from the water bottom 112 a second time before traveling upward through the formation 102, the water 106 and past a receiver 110 along raypath 150. In the second example, the seismic waves travel downward through the water 106 from a seismic source 108 along raypath 160, reflect from the water bottom 112 a first time and travel upward through the water 106 along raypath 162, reflect from the water surface 116 a first time and travel downward through the water 106 along raypath 164, reflect from the water bottom 112 a second time and travel upward through the water 106 along raypath 166, reflect from the water surface 116 a second time and travel downward through the water 106 and then the formation 102 along raypath 168, and finally reflect from the interface 114 before traveling upward through the formation 102, the water 106 and past a receiver 110 along raypath 170. Both of these latter two examples of surface multiples are multiples of order two, since the multiples contain two reflections from the water surface 116. In general, a surface multiple is of order i if the multiple contains i reflections from the water surface 116. Surface multiples are extraneous noise which obscures the desired primary reflection signal.

Surface multiple attenuation is a prestack inversion of a recorded wavefield which removes all orders of all surface multiples present within the marine seismic signal. Unlike some wave-equation-based multiple-attenuation algorithms, surface multiple attenuation does not require any modeling of or assumptions regarding the positions, shapes and reflection coefficients of the multiple-causing reflectors. Instead, surface multiple attenuation relies on the internal physical consistency between primary and multiple events that must exist in any properly recorded marine data set. The information needed for the surface multiple attenuation process is already contained within the seismic data.

In the following discussion, let upper-case letters represent the original seismic wavefields, the corresponding recorded data sets, or the corresponding data cubes or matrices. Thus let D represent a marine seismic data set corresponding to a wavefield D. The wavefield D can be divided into two parts, $$D=P+M. \tag{1}$$

The primary wavefield, P, represents that portion of D which contains no surface multiples. The surface multiples wavefield, M, represents that portion of D which contains surface multiples of any order. Surface multiple attenuation is a processing method for removing the multiples wavefield M from the recorded wavefield D to yield the desired primary wavefield P.

For each i from 1 to $\infty$, let $M_i$ represent that portion of M containing surface multiples of order i. Then the surface multiple wavefield M can be further decomposed into an infinite sum of different orders, $$M=M_1+M_2+\ldots+M_i+\ldots. \tag{2}$$

Recorded data sets have a finite duration, so only a finite number of terms from Eq. (2) are needed to represent the corresponding wavefield. Substituting an appropriately truncated Eq. (2) into Eq. (1) yields $$D=P+M_1+M_2+\ldots+M_n, \tag{3}$$

for some value n.

The process of surface multiple attenuation assumes that surface multiple events $M_i$ of order i can be predicted from knowledge of both the surface multiple events $M_{i-1}$ of order i−1 and the primary wavefield P. This assumption means that there exists some mathematical operator O such that $$M_i=POM_{i-1}. \tag{4}$$

Inserting Eq. (4) into Eq. (3) and factoring out first P and then O yields $$\begin{aligned} D &= P + POP + POM_1 + \ldots + POM_{n-1} \\ &= P[1 + O(P + M_1 + \ldots + M_{n-1})]. \end{aligned} \tag{5}$$

Define a truncated version of D by $$\begin{aligned} D_T &= P + M_1 + \ldots + M_{n-1} \\ &= D - M_n \end{aligned} \tag{6}$$

In practice, as will be discussed later, $D_T$ would be approximated by truncating the traces in D in time rather than actually constructing and subtracting $M_n$ from D. Inserting Eq. (6) into Eq. (5) yields the compact form $$D=P[1+OD_T]. \tag{7}$$

Eq. (7) is a formula for recursive forward modeling of surface multiples. Eq. (7) represents adding the events of order n to the wavefield containing all events up to and including order n−1. If the bracketed expression in Eq. (7) has an inverse, then Eq. (7) can be inverted to yield $$P=D[1+OD_T]^{-1}. \tag{8}$$

Eq. (8) is the inverse of the recursive forward modeling equation, Eq. (7). Eq. (8) states that if a suitable operator O can be found, then the primary wavefield P, free of surface multiples, can be computed directly from the recorded wavefield D. The operator O being suitable means that the operator O must be both geophysically and mathematically plausible. The operator O being geophysically plausible means that the operator O satisfies Eq. (4). The operator O being mathematically plausible means firstly that the factorizations in Eq. (5) are valid and secondly that the inverse of the bracketed expression in Eq. (7) exists and thus Eq. (8) is valid.

Let lower-case letters represent individual traces or events within the wavefields or data sets. Thus $m_i$ is a multiple event of order i within a trace d in the wavefield D. Riley and Claerbout, "2-D Multiple Reflections" Geophysics, vol 41, 1976, pp. 592–620, derive the one-dimensional versions of Eqs. (7) and (8). Assume that the earth has a single, flat, reflecting layer, is laterally homogeneous and the marine source creates a spike-like plane wave traveling vertically downward. Under these conditions, every trace in the wavefield D is the same, so the entire wavefield D can be represented by a single trace d. Letting the reflection coefficient of the water surface be −1, the following recursive formula holds for predicting the surface multiple event $m_i$ of order i from the surface multiple event $m_{i-1}$ of order i−1 and the primary event p in the trace d, $$m_i = -p * m_{i-1}, \quad (9)$$

where * represents convolution in the time domain. Eq. (9) is a one-dimensional version of Eq. (4). Here, the operator O has become convolution followed by multiplication by −1. The factorizations in Eq. (5) are mathematically valid since convolution is a commutative process. The inversion in Eq. (8) is mathematically valid since it is simply deconvolution. In this case, the one-dimensional version of Eq. (8) becomes $$p = d * [1 - d_T]^{-1}. \quad (10)$$

The expression in brackets in Eq. (10) acts as a filter whose inverse deconvolves the surface multiples in trace d. Eq. (10) works equally well for one-dimensional models of surface multiple attenuation having any number of reflective layers.

Directly applying Eqs. (9) and (10) to the two- or three-dimensional cases of surface multiple attenuation is not practical, however. A two- or three-dimensional version of Eq. (9) must honor the wave equation. The Kirchhoff integral, a mathematical statement of Huygens' principle, does honor the wave equation. The Kirchhoff integral provides a two- or three-dimensional generalization of Eq. (9), and, thus, is the basis of a geophysically suitable operator O. Several different approaches to two-dimensional surface multiple attenuation are described in the literature. Riley and Claerbout, "2-D Multiple Reflections", Geophysics, vol. 41, 1976, pp. 592–620, extend their one-dimensional deconvolution to two-dimensional using a finite difference scheme based on the scalar wave equation and using information on the source wavelet and reflectivities. Fokkema and Van den Berg, "Removal of Surface-Related Wave Phenomena: the Marine Case" 60th Annual International Meeting, SEG, Expanded Abstracts, 1990, pp. 1689–1692, describe a method of removing surface multiples that is derived from the Rayleigh reciprocity theorem. Solution is by direct matrix inversion or an iterative Neumann series, using information about the source wavelet and water layer properties. Verschuur, "Surface-Related Multiple Elimination in Terms of Huygens' Sources", J. of Seismic Exploration, vol. 1, 1992, pp. 49–59, and Verschuur et al., "Adaptive Surface-Related Multiple Elimination" Geophysics, vol. 57, no. 1, 1992, pp. 1166–1177, solve the surface multiple problem using an f-x domain method based on Huygens' principle, using information about the source wavelet and free surface reflectivity properties. A scaled estimate of the source wavelet may be adaptively calculated Carvalho et al., "Examples of a Nonlinear Inversion Method Based on the T Matrix of Scattering Theory: Application to Multiple Suppression", 61st Annual International Meeting, SEG, Expanded Abstracts, 1991, pp. 1319–1322, formulate a method of multiple suppression in terms of T-matrix scattering theory, using an estimate of the source wavelet. All of these methods are closely related because all of them must honor the acoustic wave equation.

SUMMARY OF THE INVENTION

The present invention is a method for substantially attenuating surface multiples from a marine seismic signal. The marine seismic signal is truncated in time in the time domain. Both the marine seismic signal and the truncated signal are transformed from time domain into frequency domain and represented by matrices D and $D_T$, respectively. Eigenvalue decomposition $D_T = S \cdot \Lambda \cdot S^{-1}$ is computed. Here $\Lambda$ is the diagonal matrix whose elements are the eigenvalues of $D_T$, and S is the square matrix whose rows are the corresponding eigenvectors of $D_T$. $S^{-1}$ is the matrix inverse of S. Matrix product $D \cdot S$ is computed and saved in memory and matrix inverse $S^{-1}$ is computed and saved in memory. An initial estimate for the source wavelet w is made. Diagonal matrix $[I - w^{-1}\Lambda]$ is computed and the matrix inverse $[I - w^{-1}\Lambda]^{-1}$ is computed. The matrix product $D \cdot S$ and matrix inverse $S^{-1}$ are retrieved from memory and the matrix product $[D \cdot S] [I - w^{-1}\Lambda]^{-1} S^{-1}$ is computed. The source wavelet w is computed by minimizing the total energy in the matrix product $[D \cdot S] [I - w^{-1}\Lambda]^{-1} S^{-1}$, using an iterative loop. Primary matrix P is computed by inserting the computed value for the source wavelet w into the expression $P = [D \cdot S] [I - w^{-1}\Lambda]^{-1} S^{-1}$. Finally, matrix P is inverse transformed from frequency domain into time domain.

BRIEF DESCRIPTION OF THE DRAWINGS

A better understanding of the benefits and advantages of the present invention may be obtained from the appended detailed description and drawing figures, wherein.

DESCRIPTION OF THE PREFERRED EMBODIMENTS

Use of the Kirchhoff integral provides the appropriate two- or three-dimensional generalization of the inverse of the recursive forward modeling equation for surface multiple attenuation, as given in general by Eq. (8) and in one-dimensional form by Eq. (10). The following discussion focuses on a two-dimensional implementation of surface multiple attenuation. The Kirchhoff integral must be made compatible with Eqs. (4) through (8). First, the recorded marine seismic data are Fourier transformed from the time domain to the frequency domain. Let p and m represent single-frequency components of Fourier-transformed traces. For example, $m_i(S,R)$ is one frequency component of the trace whose source and receiver were at positions S and R, respectively, and which contains only surface multiples of order i. Let $m_{M,i-1}$ represent $m_{i-1}$ after being modified to include the scale and phase corrections and the obliquity factor required by the Kirchhoff integral. The Kirchhoff modification is given by $$m_{M,i-1}(x,R) = (1-j)\sqrt{\omega/4\pi}\ \cos[\sin^{-1}(k_x V/\omega)]m_{i-1}(x,R), \quad (11)$$

where x=inline coordinate, $j=(-1)^{1/2}$

ω=angular frequency, $k_x$=x-component of wavenumber vector, and

V=speed of sound in water.

Because of $k_x$, the modification of $m_{i-1}$ is dip-dependent. In the frequency domain, the Kirchhoff integral can be written as $$m_i(S,R) = -\int p(S,x) m_{M,i-1}(x,R) dx. \quad (12)$$

As in Eq. (9), the minus sign is due to the negative reflection coefficient of the water surface.

In practice, recorded wavefields are not continuous in x, so the integral in Eq. (12) has to be replaced by the following discrete summation over x $$m_i(S,R) = -\Sigma p(S,x) m_{M,i-1}(x,R). \quad (13)$$

Except for the minus sign, Eq. (13) is the formula for computing one element of the product of two matrices. Thus, define $M_{i-1}$ as the matrix whose columns are the common-receiver records, $m_{i-1}(x,R)$, define $M_{M,i-1}$ as the matrix whose columns are the Kirchhoff-modified common-receiver records, $m_{M,i-1}(x,R)$, and define P as the matrix whose rows are the common-shot records, $p(S,x)$. Then Eq. (13) becomes $$M_i = -P \cdot M_{M,i-1}. \quad (14)$$

Since the matrix indices are the shot and receiver coordinates, the zero-offset traces lie along the main diagonal of each matrix. If the operator O in Eq. (4) is matrix multiplication and the quantities in uppercase are matrices, then Eq. (4) becomes Eq. (14) and so Eq. (8) becomes $$P = D[I - D_M]^{-1}, \quad (15)$$

where I is the identity matrix and the "−1" superscript indicates matrix inversion.

For ideal data, Eq. (15) provides a simple algorithm for two-dimensional surface multiple attenuation. By "ideal" is meant that the wavefield is recorded broadband, contains no noise, has all wavelet effects, including source and receiver ghosts, removed, and has a trace-offset range that begins at zero offset. Furthermore, each individual sample within the data set D must have a true relative amplitude with respect to every other sample within D. All of the traces in a data set are Fourier-transformed and inserted into a data cube, D(S, R,f). Here S is source position, R is receiver position, and f is frequency. Next, the original traces are also truncated in time, Fourier-transformed, Kirchhoff-modified, and inserted into another data cube, $D_M(S,R,f)$. For each frequency f, matrices D(S,R) and $D_M(S,R)$ are extracted from the data cubes D and $D_M$, respectively, and inserted into Eq. (15). A matrix inversion and a matrix multiplication yields primary matrix P(S,R), which is inserted into an output data cube, P(S,R,f). Finally, each trace in data cube P is inverse Fourier transformed and reorganized into gathers.

For non-ideal data, wavelet effects have not been removed and are the major factor which must be taken into consideration. According to the convolutional model, a recorded seismic trace consists of a possibly time varying wavelet convolved with the earth's reflection series. The wavelet contains a component related to the acquisition equipment, called the source wavelet, and a component due to earth attenuation and absorption. The impact of the earth component on surface multiple attenuation can be seen by considering how Eq. (9) is affected. If the earth component is significant, then events p, $m_i$ and $m_{i-1}$ will each contain a particular wavelet that represents the effects that the earth has on the corresponding wavefield propagating through the earth. Since the total earth layers traversed by event $m_i$ is just the sum of the earth layers traversed by event p and event $m_{i-1}$, the wavelet in $m_i$ will, according to the convolutional model, simply be a convolution of the other two wavelets. Thus, any wavelet effects due to propagation through the earth appear identically on the two sides of Eq. (9), so surface multiple attenuation is not affected by earth filtering.

In contrast, if the three events each contain the same source wavelet, that wavelet will appear twice on the right side of Eq. (9), but only once on the left side. Therefore, Eq. (9) no longer holds for this case, and surface multiple attenuation cannot be accomplished by applying Eq. (10). In theory, this problem is easily fixed by redefining operator O to include a convolution by the inverse of the source wavelet w. Eq. (15) becomes $$P = D[I - w^{-1} D_M]^{-1}, \quad (16)$$

where $w^{-1}$ is the wavelet inverse. Since Eq. (16) is in the frequency domain, convolution is accomplished by multiplication. In practice, however, the source wavelet w is initially unknown.

The source wavelet w can be found by minimizing the total energy in P in Eq. (16). When w=0 in Eq. (16), the total energy in P is the same as that in D, so no surface multiple attenuation occurs. As the inverse wavelet amplitude increases, Eq. (16) begins to attenuate the surface multiples, so the total energy in P decreases. If, however, the inverse wavelet amplitude becomes too large, then Eq. (16) overpredicts the surface multiples and the total energy in P begins to rise. The total energy minimum occurs when the inverse wavelet exactly compensates for the source wavelet. Thus surface multiple attenuation becomes an $L_2$-norm minimization problem, which has standard solutions, such as the conjugate gradient technique. One could also minimize other measures of the surface multiple energy in P.

Figure 2:
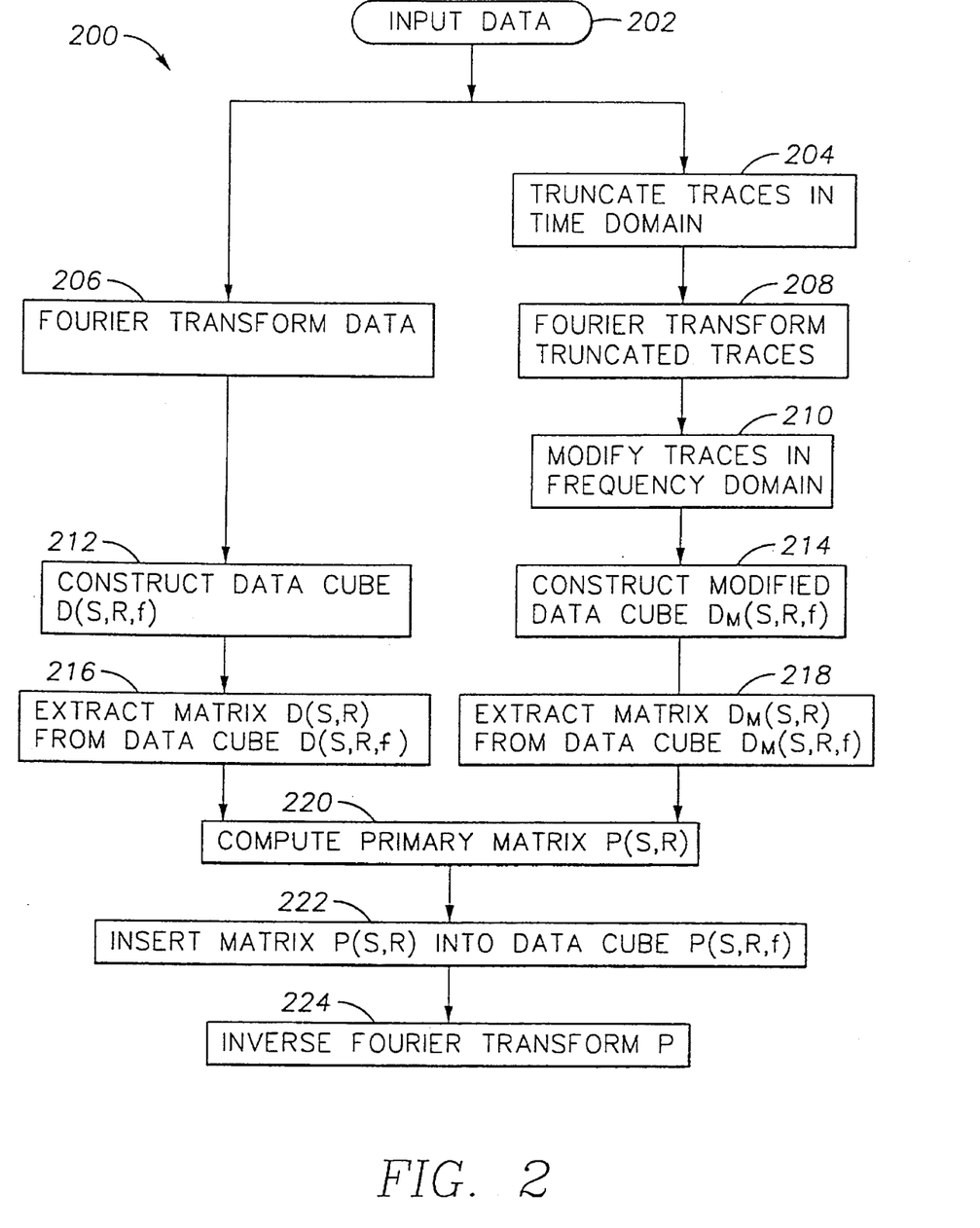
FIG. 2 is a schematic diagram of the general method of surface multiple attenuation.

FIG. 2 shows a schematic diagram of the general method for attenuating surface multiples from a marine seismic signal. The method is designated generally as 200. A two-dimensional marine data set is recorded as a seismic signal, as shown in Block 202. The traces which comprise the data set are truncated in time, as shown in Block 204. Both the data set from Block 202 and the truncated traces from Block 204 are Fourier transformed from the time domain into the frequency domain, as shown in Blocks 206 and 208, respectively. The transformed truncated traces are modified in the frequency domain to include the obliquity, scale and phase factors required by the Kirchhoff integral and given by Eq. (11), as shown in Block 210. The transformed data are used to construct a data cube D(S,R,f), as shown in Block 212. Here S is source location, R is receiver location, and f is frequency. The modified traces are used to construct another data cube, the modified data cube $D_M(S,R,f)$, as shown in Block 214. Next, the series of steps in Blocks 216, 218, 220 and 222 are repeated for each value of frequency f in data cube D(S,R,f). Thus, for each frequency f, a matrix D(S,R) is extracted from data cube D(S,R,f), as shown in Block 216, and a modified matrix $D_M(S,R)$ is extracted from modified data cube $D_M(S,R,f)$, as shown in Block 218. For each frequency f, the primary matrix P(S,R) is computed from matrices $D(S,R)$ and $D_M(S,R)$, as shown in Block 220. The computation of the matrix P in Block 220 involves the solving of Eq. (8) as given by either Eq. (15) or Eq. (16) and will be discussed in greater detail below. In particular, the present invention is an improved method for computing P. For each frequency f, the matrix $P(S,R)$ is inserted into data cube $P(S,R,f)$, as shown in Block 222, thus constructing the primary data cube P. Finally, the data cube P is inverse Fourier transformed from the frequency domain into the time domain, as shown in Block 224.

Figure 3:
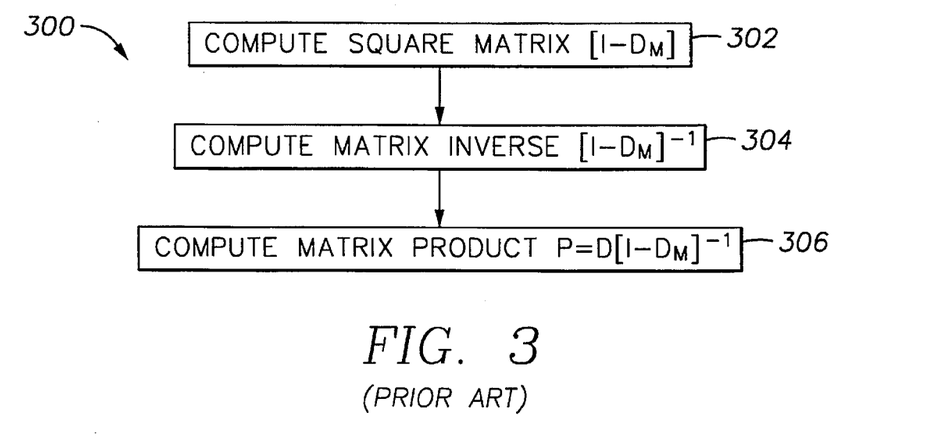
FIG. 3 is a schematic diagram of a prior art method of surface multiple attenuation for ideal data.

FIG. 3 shows a schematic diagram of a prior art method for computing the primary matrix $P(S,R)$, as designated in Block 220 of FIG. 2, for ideal data. The method shown in FIG. 3 is designated generally as 300. Square matrix $[I-D_M]$ is computed, as shown in Block 302. Here I is the identity matrix. The matrix inverse $[I-D_M]^{-1}$ of the square matrix $[I-D_M]$ is computed, as shown in Block 304. The primary matrix $P(S,R)$ is computed directly from the expression given by Eq. (15), $$P=D[I-D_M]^{-1}, \qquad (15)$$

as shown in Block 306. Since the source wavelet w does not appear in Eq. (15), there is no need to estimate or compute w.

Figure 4:
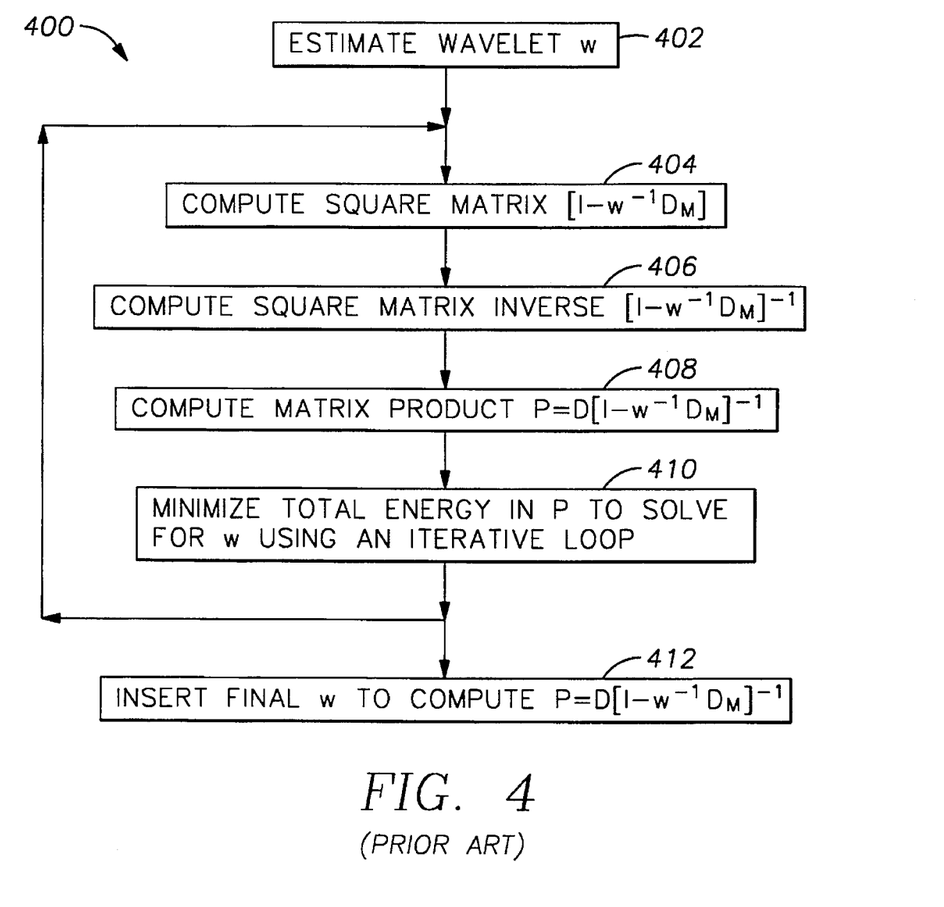
FIG. 4 is a schematic diagram of a prior art method of surface multiple attenuation for non-ideal data.

FIG. 4 shows a schematic diagram of a prior art method for computing the primary matrix $P(S,R)$, as designated in Block 220 of FIG. 2, for non-ideal data. The method shown in FIG. 4 is designated generally as 400. An initial estimate for the value of the complex scalar representing the source wavelet w is made, as shown in Block 402. Square matrix $[I-w^{-1}D_M]$ is computed, as shown in Block 404. Here I is the identity matrix. The matrix inverse $[I-w^{-1}D_M]^{-1}$ of the square matrix $[I-w^{-1}D_M]$ is computed, as shown in Block 406. An expression for the primary matrix $P(S,R)$ is computed from the matrix product given by Eq. (16), $$P=D[I-w^{-1}D_M]^{-1}, \qquad (16)$$

as a function of the source wavelet w, as shown in Block 408. A value for the wavelet w is computed by minimizing the total energy in the expression for P in w, as shown in Block 410. The minimization is accomplished by an iterative loop of Blocks 404, 406, 408 and 410. Finally, the primary matrix P is computed by inserting the final computed value for the wavelet w into the expression given by Eq. (16), $$P=D[I-w^{-1}D_M]^{-1}, \qquad$$

as shown in Block 412.

The computation of P as described above requires computing the source wavelet w by minimizing the total energy in P in an iterative loop. This requires computing the inverse of the matrix quantity in brackets in Eq. (16) during each iteration for a new value of w. Computing the inverse of the matrix may be accomplished by a series expansion or an exact matrix inversion. The series expansion approach is approximate and can be slowly converging. Previous exact approaches to surface multiple attenuation require a large number of inversions of large square matrices. Square matrix inversion is computationally expensive. The present invention is an exact approach to solving Eq. (16) which makes computing the matrix inverse in each iteration much less costly. The source wavelet is calculated using an eigenvalue decomposition to factor the inversion equation given by Eq. (16). The resulting simplification requires only one initial inversion of a square matrix and many inversions of diagonal matrices. Diagonal matrix inversion is computationally much less expensive than square matrix inversion.

The present invention begins by computing the eigenvalue decomposition of the $D_M$ matrix, $$D_M = S\Lambda S^{-1}. \qquad (17)$$

Here $\Lambda$ is the diagonal matrix whose elements are the eigenvalues of $D_M$, and S is the square matrix whose rows are the corresponding eigenvectors of $D_M$. $S^{-1}$ is the matrix inverse of S. Inserting Eq. (17) into Eq. (16) yields $$P=D[I-w^{-1}S\Lambda S^{-1}]^{-1}. \qquad (18)$$

The symmetric nature of the eigenvalue decomposition allows one to rewrite the inverse of the matrix expression in brackets in Eq. (18). Replacing the identity matrix I by the equivalent expression $S \cdot S^{-1}$ in the matrix expression in brackets from Eq. (18) and factoring S out to the left of the brackets and $S^{-1}$ out to the right of the brackets yields $$[SS^{-1}-w^{-1}S\Lambda S^{-1}]S[I-w^{-1}\Lambda]^{-1}S^{-1}=S[I-w^{-1}\Lambda]S^{-1}S[I-w^{-1}\Lambda]^{-1}S^{-1}=I \qquad (19)$$

Eq. (19) shows that the inverse of the matrix expression in brackets from Eq. (18) can be rewritten as $$[I-w^{-1}S\Lambda S^{-1}]^{-1}=S[I-w^{-1}\Lambda]^{-1}S^{-1} \qquad (20)$$

Inserting Eq. (20) into Eq. (18) yields $$P=DS[I-w^{-1}\Lambda]^{-1}S^{-1}. \qquad (21)$$

Now the expression in brackets in Eq. (21) is a diagonal matrix, since both I and $\Lambda$ are diagonal matrices and $w^{-1}$ is a complex scalar. Thus the expression in brackets in Eq. (21) can be inverted many times at low cost.

In the preferred embodiment of the present invention, using the eigenvalue decomposition, the matrix product $D \cdot S$ and the inverse $S^{-1}$ are computed only once and then saved in memory. After that initial cost, the incremental cost of recomputing Eq. (21) is that of a matrix multiplication and a diagonal matrix inversion, whereas the incremental cost of recomputing Eq. (16) is that of a matrix multiplication and a square matrix inversion. If the dimension of the matrices involved is n, then recomputing Eq. (16) takes approximately $2n^3$ order of magnitude floating point operations for each iteration, while recomputing Eq. (21) takes only approximately $(n^3+n)$ order of magnitude operations for each iteration but the first.

Figure 5:
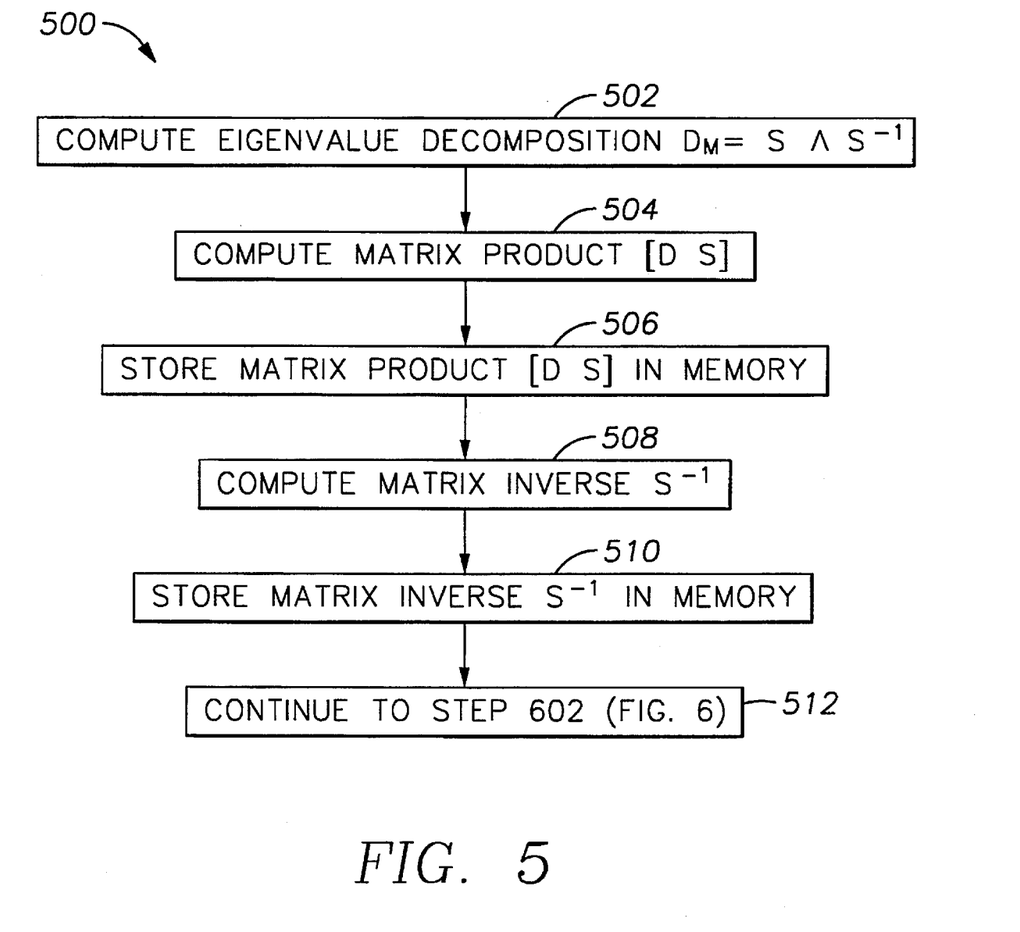
FIG. 5 is a schematic diagram of the preliminary steps of the method of the present invention for surface multiple attenuation for non-ideal data.
Figure 6:
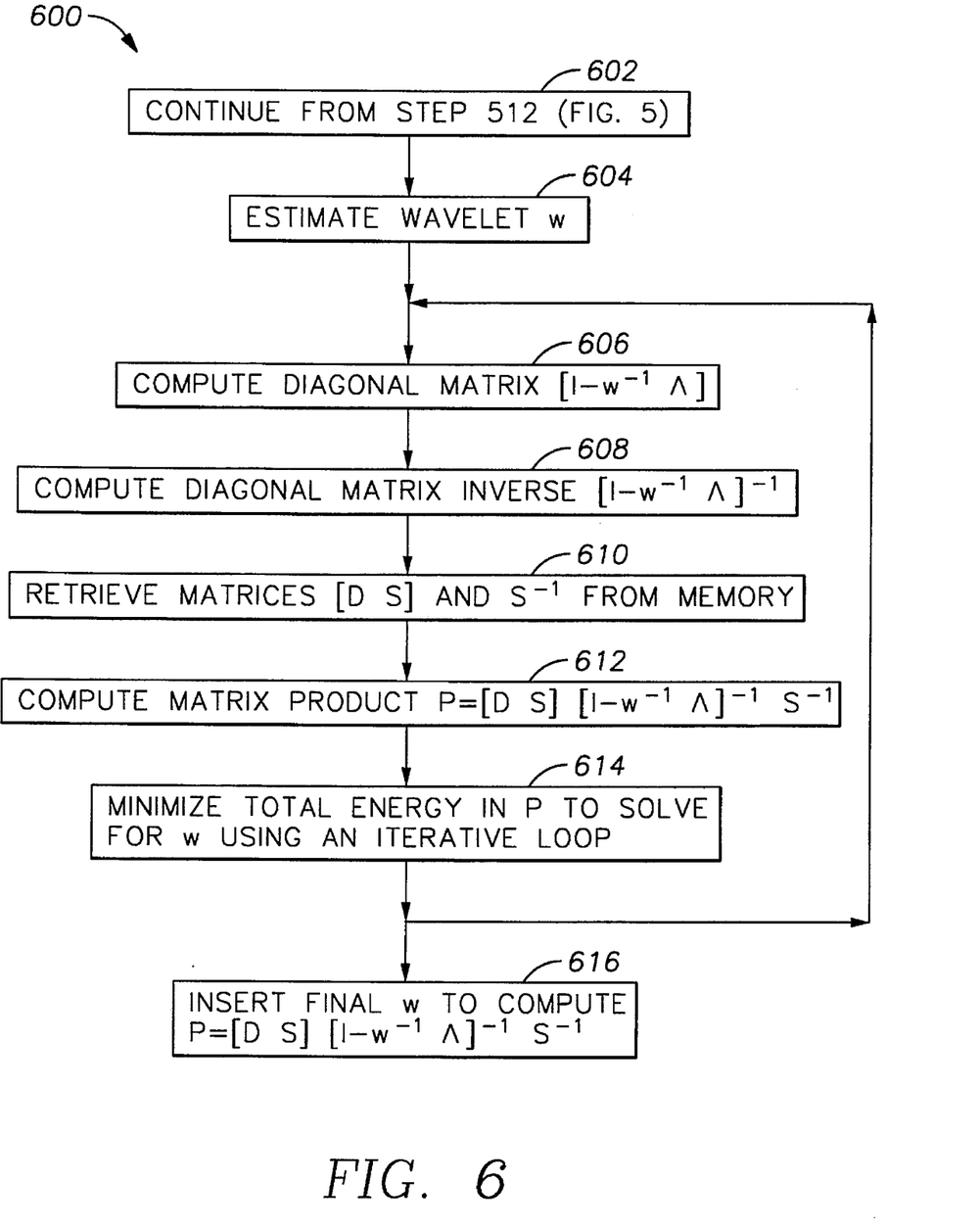
FIG. 6 is a schematic diagram of the remaining steps comprising the iterative loop of the method of the present invention for surface multiple attenuation for non-ideal data.

FIGS. 5 and 6 show schematic diagrams of the method of the present invention for computing primary matrix $P(S,R)$, as designated in Block 220 of FIG. 2, for non-ideal data. The preliminary steps of the method are shown in FIG. 5 and are designated generally as 500. An eigenvalue decomposition $D_M=S \cdot \Lambda \cdot S^{-1}$ of the modified matrix $D_M(S,R)$ is computed, as shown in Block 502. Here the rows of matrix $S(S,R)$ are constructed from the eigenvectors of modified matrix $D_M$ and matrix $\Lambda(S,R)$ is a diagonal matrix whose diagonal elements are the corresponding eigenvalues of modified matrix $D_M$. Matrix product $D \cdot S$ is computed once, as shown in Block 504, and then the matrix product $D \cdot S$ is saved in memory, as shown in Block 506. Matrix inverse $S^{-1}$ of the matrix S is also computed once, as shown in Block 508, and then the matrix inverse $S^{-1}$ is also saved in memory, as shown in Block 510. The point at which the schematic diagram of FIG. 5 continues onto FIG. 6 is shown by Block 512.

The remaining steps comprising the iterative loop in the method of the present invention for computing matrix $P(S,R)$ are shown in FIG. 6 and are designated generally as 600. The point at which the schematic diagram of FIG. 6 continues from Block 512 of FIG. 5 is shown by Block 602. An initial estimate for the value of the complex scalar representing the source wavelet w is made, as shown by Block 604. Diagonal matrix $[I-w^{-1}\Lambda]$ is computed, as shown in Block 606. Here I is the identity matrix. The matrix inverse $[I-w^{-1}\Lambda]^{-1}$ of the diagonal matrix $[I-w^{-1}\Lambda]$ is computed, as shown in Block 608. The matrix product D·S and the matrix inverse $S^{-1}$ are retrieved from memory, as shown in Block 610. An expression for the primary matrix P(S,R) is computed from the matrix product given by Eq. (21), $$P=[D\cdot S][I-w^{-1}\Lambda]^{-1}S^{-1},$$

as a function of the wavelet w, as shown in Block 612. A value for the source wavelet w is computed by minimizing the total energy in the expression for P in w, as shown in Block 614. The minimization is accomplished by an iterative loop of Blocks 606, 608, 610, 612 and 614. Finally, matrix P(S,R) is computed by inserting the final computed value for the source wavelet w into the expression given by Eq. (21), $$P=[D\cdot S][I-w^{-1}\Lambda]^{-1}S^{-1},$$

as shown in Block 616.

In conclusion, the present invention replaces one matrix in the surface multiple attenuation inversion equation, given in Eq. (16), by its eigenvalue decomposition, given in Eq. (17). The structure of the surface multiple attenuation inversion equation allows factorization, after the eigenvalue decomposition, in such a way that the resulting matrix to be inverted is now diagonal, as in Eq. (21). This, in turn, allows many inversions of the diagonal matrix at a much smaller cost. In the published literature dealing with implementing the surface multiple attenuation equation, the matrix inversion is approximated by performing a series expansion of the matrix. The present invention is superior because it provides an exact solution rather than an approximate solution. In addition, the present invention determines the average source wavelet imbedded in the wavefield. Furthermore, in an alternative embodiment, small values in the diagonal matrix $[I-w^{-1}\Lambda]$ can be ignored once they are found, as well as the corresponding eigenvectors in S and the corresponding row vectors in $S^{-1}$. This technique can improve the numerical stability of the matrix inversion calculation and further decrease the computational cost. In another alternative embodiment, the matrix computations in the iteration steps may be carried out for predetermined groups of frequencies, such as swaths of frequencies, rather than for each individual frequency. This technique will further reduce the computational cost.

The present invention has been described with a certain degree of specificity. Variations will occur to those skilled in the art which are within the scope of the invention, which is limited only by the appended claims.

We claim:

1. A method for substantially attenuating surface multiples from a marine seismic signal, comprising the steps of:

transforming said marine seismic signal from time domain into frequency domain to generate a transformed signal represented by matrix D, truncating said marine seismic signal in time to generate a truncated signal and transforming said truncated signal from time domain into frequency domain to generate a transformed truncated signal represented by truncated matrix $D_T$;

computing eigenvalue decomposition $D_T=S\cdot\Lambda\cdot S^{-1}$ of said truncated matrix $D_T$; where $\Lambda$ is the diagonal matrix whose elements are the eigenvalues of $D_T$, S is the square matrix whose rows are the corresponding eigenvectors of $D_T$ and $S^{-1}$ is the inverse of S, solving for source wavelet w by minimizing total energy in matrix product $[D\cdot S][I-w^{-1}\Lambda]^{-1}S^{-1}$ in an iterative loop;

solving for primary matrix P by inserting said solved value for said source wavelet w into the expression $$P=[D\cdot S][I-w^{-1}\Lambda]^{-1}S^{-1}; \text{ and}$$

inverse transforming said primary matrix P from frequency domain into time domain.

2. The method of claim 1, wherein said computing eigenvalue decomposition step comprises the steps of:

modifying said transformed truncated signal to include obliquity, scale and phase factors required by the Kirchhoff integral, thereby generating a modified signal represented by modified matrix $D_M$; and computing eigenvalue decomposition $D_M=S\cdot\Lambda\cdot S^{-1}$ of said modified matrix $D_M$.

3. The method of claim 1, further comprising the step of:

selectively ignoring the eigenvectors in S and the corresponding row vectors in $S^{-1}$ which correspond to small values in said inverse diagonal matrix $[I-w^{-1}\Lambda]^{-1}$.

4. A method for substantially attenuating surface multiples from a marine seismic signal, comprising the steps of:

(a) transforming said marine seismic signal from time domain into frequency domain to generate a transformed signal represented by matrix D, truncating said marine seismic signal in time to generate a truncated signal and transforming said truncated signal from time domain into frequency domain to generate a transformed truncated signal represented by truncated matrix $D_T$;

(b) computing eigenvalue decomposition $D_T=S\cdot\Lambda\cdot S^{-1}$ of said truncated matrix $D_T$; where $\Lambda$ is the diagonal matrix whose elements are the eigenvalues of $D_T$, S is the square matrix whose rows are the corresponding eigenvectors of $D_T$ and $S^{-1}$ is the inverse of S, (c) computing matrix product D·S and saving said matrix product D·S in memory;

(d) computing matrix inverse $S^{-1}$ of said matrix S and saving said matrix inverse $S^{-1}$ in memory;

(e) making initial estimate of source wavelet w;

(f) computing diagonal matrix $[I-w^{-1}\Lambda]$ and computing matrix inverse $[I-w^{-1}\Lambda]^{-1}$ of said diagonal matrix $[I-w^{-1}\Lambda]$;

(g) retrieving said matrix product D·S and said matrix inverse $S^{-1}$ from said memory;

(h) computing matrix product $[D\cdot S][I-w^{-1}\Lambda]^{-1}S^{-1}$ in terms of said source wavelet w;

(i) iterating said steps (f) through (h) to solve for said source wavelet w by minimizing total energy in said matrix product $[D\cdot S][I-w^{-1}\Lambda]^{-1}S^{-1}$;

(j) solving for primary matrix P by inserting said solved value for said source wavelet w into the expression $$P=[D\cdot S][I-w^{-1}\Lambda]^{-1}S^{-1}; \text{ and}$$

(k) inverse transforming said primary matrix P from frequency domain into time domain.

5. The method of claim 4, wherein said step (b) comprises the steps of:

modifying said transformed truncated signal to include obliquity, scale and phase factors required by the Kirchhoff integral, thereby generating a modified signal represented by modified matrix $D_M$; and computing eigenvalue decomposition $D_M = S \cdot \Lambda \cdot S^{-1}$ of said modified matrix $D_M$.

6. The method of claim 4, further comprising the step of:

selectively ignoring the eigenvectors in S and the corresponding row vectors in $S^{-1}$ which correspond to small values in said inverse diagonal matrix $[I-w^{-1}\Lambda]^{-1}$.

7. A method for substantially eliminating surface multiples from a marine seismic signal, comprising the steps of:

(a) truncating said marine seismic signal in time to generate a truncated signal;

(b) transforming said marine seismic signal from time domain into frequency domain to generate a transformed signal and transforming said truncated signal from time domain into frequency domain to generate a transformed truncated signal;

(c) modifying said transformed truncated signal to include obliquity, scale and phase factors required by the Kirchhoff integral, thereby generating a modified signal;

(d) representing said transformed signal by data cube $D(T,R,f)$ and representing said modified signal by modified data cube $D_M(T,R,f)$, where T is source location, R is receiver location, and f is frequency;

(e) extracting data matrix $D(T,R)$ from said data cube $D(T,R,f)$ for a frequency f and extracting modified matrix $D_M(T,R)$ from modified data cube $D_M(T,R,f)$ for said frequency f;

(f) computing eigenvalue decomposition $D_M = S \cdot \Lambda \cdot S^{-1}$ of said modified matrix $D_M$; where $\Lambda$ is the diagonal matrix whose elements are the eigenvalues of $D_T$, S is the square matrix whose rows are the corresponding eigenvectors of $D_T$ and $S^{-1}$ is the inverse of S;

(g) computing matrix product $D(T,R) \cdot S$ and saving said matrix product $D(T,R) \cdot S$ in memory;

(h) computing matrix inverse $S^{-1}$ of said matrix S and saving said matrix inverse $S^{-1}$ in memory;

(i) making initial estimate of source wavelet w;

(j) computing diagonal matrix $[I-w^{-1}\Lambda]$ and computing matrix inverse $[I-w^{-1}\Lambda]^{-1}$ of said diagonal matrix $[I-w^{-1}\Lambda]$;

(k) retrieving said matrix product $D(T,R) \cdot S$ and said matrix inverse $S^{-1}$ from said memory;

(l) computing matrix product $[D(T,R) \cdot S][I-w^{-1}\Lambda]^{-1}S^{-1}$ in terms of said source wavelet w;

(m) iterating said steps (j) through (1) to solve for said source wavelet w by minimizing total energy in said matrix product $[D(T,R) \cdot S][I-w^{-1}\Lambda]^{-1}S^{-1}$;

(n) solving for primary matrix $P(T,R)$ by inserting said solved value for wavelet w into the expression $$P=[D(T,R) \cdot S][I-w^{-1}\Lambda]^{-1}S^{-1};$$

(o) inserting said primary matrix $P(T,R)$ into data cube $D(T,R,f)$ for said frequency f;

(p) repeating said steps (e) through (o) for each frequency f in said data cube $D(T,R,f)$; and (q) inverse transforming said data cube $D(T,R,f)$ from frequency domain into time domain.

8. The method of claim 7, further comprising the step of:

selectively ignoring the eigenvectors in S and the corresponding row vectors in $S^{-1}$ which correspond to small values in said inverse diagonal matrix $[I-w^{-1}\Lambda]^{-1}$.

9. The method of claim 7, further comprising the step of:

carrying out the iterations in step (m) for predetermined groups of frequencies rather than for each individual frequency.

* * * * *